United States Patent [19]

Mouri et al.

[11] Patent Number: 5,234,884
[45] Date of Patent: Aug. 10, 1993

[54] ADSORBENT COMPOSITION AND METHOD OF PRODUCING SAME

[75] Inventors: Motoya Mouri, Ibaraki; Tatsuro Takeuchi, Moriyama, both of Japan

[73] Assignee: Takeda Chemical Industries, Ltd., Osaka, Japan

[21] Appl. No.: 640,417

[22] PCT Filed: Nov. 30, 1989

[86] PCT No.: PCT/JP90/01544

§ 371 Date: Jan. 15, 1991

§ 102(e) Date: Jan. 15, 1991

[87] PCT Pub. No.: WO91/08049

PCT Pub. Date: Jun. 13, 1991

[30] Foreign Application Priority Data

Nov. 30, 1989 [JP] Japan ................... 1-312894

[51] Int. Cl.$^5$ .............. B01J 20/06; B01J 20/02; C10K 1/20; B01D 53/02
[52] U.S. Cl. .................. 502/405; 252/189; 252/193; 422/5; 423/230; 423/231; 423/237; 502/400; 502/406
[58] Field of Search ........... 502/405, 406, 400, 208, 502/213

[56] References Cited

U.S. PATENT DOCUMENTS

| | | | |
|---|---|---|---|
| 2,554,819 | 5/1951 | Eads | 23/2 |
| 4,059,679 | 11/1977 | Clearfield | 502/213 |
| 4,384,985 | 5/1983 | Crum et al. | 502/213 |
| 5,135,904 | 8/1992 | Kamiya et al. | 55/73 |

FOREIGN PATENT DOCUMENTS 0336069 10/1989 European Pat. Off. .
2568483 7/1986 France .

*Primary Examiner*—Paul E. Konopka
*Attorney, Agent, or Firm*—Wenderoth, Lind & Ponack

[57] ABSTRACT

A precipitate composition comprising a water-insoluble phosphate of at least one metal selected from the group consisting of Ti, Zr and Sn, and a hydroxide of at least one metal selected from the group consisting of Fe, Co., Ni, Zn and Cu.

The precipitate composition of the invention can be used as an adsorbent composition, which shows high adsorption capacity for acidic malodorous gases, such as hydrogen sulfide, as well as alkaline malodorous gases, such as ammonia.

16 Claims, No Drawings

ADSORBENT COMPOSITION AND METHOD OF PRODUCING SAME

DESCRIPTION

1. Technical Field

This invention relates to a novel precipitate composition for the removal of malodorous substances of components and to a method of producing such composition. The adsorbent composition according to the invention can be widely used in eliminating unpleasant or foul odors and toxic gases emanating in the household from toilet facilates, stores in refrigerators, garbage and the like, and in various areas of industry from hospitals, hotels, automobiles, cattle farms, poultry farms, waste water disposal plants and the like.

2. Background Art

Malodors which give a disagreeable or unpleasant sensation to humans may emanate from various daily living environments and from various facilates such as factories, sewage disposal plants refuse disposal plants, garbage incinerators, cattle farms and poultry farms. In recent years, the number of complaints about such odors or, in other words, "malodor pollution", has shown a tendency toward increasing.

Substances causative of such malodors may include, but are not limited to, ammonia, hydrogen sulfide, and amines, mercaptans, aldehydes and lower fatty acids, among others. Actual malodorous components may be more completed in nature.

Investigations have recently been conducted energetically to elaborate deodorization techniques for such malodors and various measures such as mentioned below have been proposed.

(i) Masking

This technique comprises masking an odor with an aroma substance or neutralizing an odor with a plant extract component or components. It consists in mere masking, or concealing, malodors with a perfume or the like but can never eliminate malodorous substances to any substantial extent. As regard the technique utilizing the odor-neutralizing action, no scientific grounds therefor are known.

(ii) Chemical means

This technique involves neutralization of malodorous substances with an acid or alkali, or decomposition thereof by means of an oxidizing agent or reducing agent. As for the technique involving neutralization, substances which can be treated are limited to specific species. For neutralization, and for oxidation or reduction, safety problems may arise and equipment may become complicated.

(iii) Biological deodorization

This technique utilizes microorganisms or enzymes. It is inferior in deodorization rate and in lifetime of microorganisms or enzymes, and has a limited use condition.

(iv) Adsorption

This technique removes malodorous components by adsorption using an adsorbent such as activated carbon. This technique cannot cope with a strong odor since the capacity (adsorbency) of the adsorbent is generally insufficient. Furthermore it is difficult to remove various malodorous substances with one single adsorbent species.

Although these deodorization techniques are more or less effective and some are in practical use, further technical improvements are demanded because of the problems mentioned above.

The present inventors have so far made various investigations aiming at elimination of malodors offering problems in daily living environments as well as industrial malodors by means of adsorbents. Activated carbon is widely used as one of such adsorbents for deodorization. However, activated carbon is not a satisfactory deodorizing adsorbent since when it is used alone, its capacity to adsorb ammonia or hydrogen sulfide is small. Therefore modifications of activated carbon which carry a halide, metal ion, acid or alkali, for instance on the surface thereof, have been proposed. However, no deodorizer having satisfactory performance characteristics has been obtained as yet.

Zeolite, silica gel, activated alumina and the like are also used as deodorizers. However, they are not always satisfactory from the adsorption capacity viewpoint.

Inorganic adsorbents so far in use include zinc oxide, magnesium oxide, iron oxide and iron hydroxide, among others. These are not very effective in adsorbing gaseous ammonia although they are suited for elimination of hydrogen sulfide. To the contrary, zirconium oxide, zirconium phosphate, titanium oxide and the like show relatively good adsorption capacity for gaseous ammonia but are inferior in capacity to adsorb hydrogen sulfide.

As mentioned above, the conventional deodorizers shows a general tendency that they are effective against one of the acidic odor and basic odor but not very effective against the other [cf. Publications of Unexamined Japanese Patent Applications (Kokai Tokkyo Koho) Nos. 64-47445, 55-51421, 53-137089, 58-156539, 59-146758, 63-22074, 1-148340, 1-151938 and 1-203040).

Japanese Kokai Tokkyo Koho No. 63-54935 discloses an absorbent using $TiO_2$, which adsorption capacity is not satisfactory. Japanese Kokai Tokkyo Koho No. 63-258644 discloses deodorizers in which a mere mixture of phosphoric acid or a salt thereof with Fe, Co, Ni, or Zr or a compound thereof is carried on conventional carriers (e.g. activated carbon). However, they are still unsatisfactory in deodorizing effect.

DISCLOSURE OF THE INVENTION

It is an object of the present invention to overcome the drawbacks of the conventional inorganic adsorbents and provide an adsorbent composition which has excellent adsorption characteristics. That is, an object of the present invention is to provide an adsorbent composition which can adsorb by itself not only acidic odors, such as hydrogen sulfide, but also basic odors, such as gaseous ammonia, and a method of producing such adsorbent.

The invention provides a precipitate composition comprising: at least one water-insoluble metal phosphate in which the metal is selected from the group consisting of Ti, Zr and Sn (Group B); and at least one metal hydroxide in which the metal is selected from the group consisting of Fe, Co, Ni, Zn and Cu (Group A). The invention provides a method of producing such composition. The invention also provides an adsorbent composition comprising the precipitate composition as mentioned above.

The absorbent according to the invention shows significantly higher adsorption characteristics as compared with mere mixtures of an oxide or salt of a metal of group A and a phosphate of a metal of group B.

DETAILED DESCRIPTION OF THE INVENTION

The precipitate composition or adsorbent composition of the present invention is obtained from an aqueous solution containing a metal of group A and a metal of group B each in ionic form. The aqueous solution may be prepared from various water-soluble metal compounds. Such compounds include various metal salts and metal alkoxides and the like.

The metal salts may include not only ordinary metal salts (normal salts) but also acid salts, hydroxide salts, oxy-salts, double salts and complex salts.

More specifically, the metal salts are halides (chloride, fluoride, iodide, bromide, etc.) of the above-mentioned metals, for example $CoCl_2$, $NiCl_2$, $CuCl_2$, $ZnCl_2$, $TiCl_4$, $SnCl_4$, $ZrCl_4$, $FeCl_2$, $FeF_2$, $FeI_2$, $FeBr_2$, $Na_2[SnF_6]$, $K_2[SnF_6]$ and $K_2[SnCl_6]$;

sulfates, ammonium sulfates and other sulfates, for example $FeSO_4$, $CoSO_4$, $CuSO_4$, $Zr(SO_4)_2$, $Sn(SO_4)_2$, $Ti(SO_4)_2$ and $(NH_4)_2Fe(SO_4)_2$; and further nitrates, chlorates, perchlorates, thiocyanates, chromates and other various inorganic acid salts, for example $Zn(NO_3)_2$, $Co(NO_3)_2$, $Cu(NO_3)_2$, $Zn(ClO_3)_2$, $Co(ClO_4)_2$, $Zn(SCN)_2$, $Zr(NO_3)_4$ and $Ti(NO_3)_4$.

The metal salts also include organic acid salts such as acetates, formates and oxalates, for example $(CH_3CO_2)_2Zn$, $(CH_3CO_2)_2Cu$, $(CH_3CO_2)_4Zr$ and $C_2O_4Co$;

oxy-metal salts in the form of halides, inorganic acid salts and organic acid salts, for example $ZrOCl_2$, $ZrOSO_4$, $TiOSO_4$, $ZrO(NO_3)_2$, $ZrOCO_3$, $(NH_4)_2ZrO(CO_3)_2$ and $ZrO(CH_3CO_2)_2$; and further metal alkoxides, for example $Zr(OCH_3)_4$ and $Ti(OCH_3)_4$.

These metal salts mentioned above may be hydrates.

Preferred examples of the zirconium salts are oxy-metal salts, such as zirconium oxychloride, zirconium oxysulfate and zirconium oxyacetate. Oxy-salts of other metals may also be used.

In the present invention, the metals of each group may be used either alone or in combinations of two or more of them.

The ion of the metal of group A and the ion of the metal of group B in the composition of the invention are mixed in the mole ratio between the metal of group A and the metal of group B (A/B) of 0.01/1 to 100/1, preferably from 0.1/1 to 10/1, more preferably from 0.2/1 to 5/1. When the metals of group A and/or the metals of group B are used in plurality, the mole ratio is to be calculated based on the total amount of the metals of group A as used and/or the total amount of the metals of group B as used. The concentration of each metal salt in the aqueous solution is not critical but preferably within the range of 0.01 to 5.0 moles per liter.

For preparing the composition of the invention, a hydroxide of a metal of group A is formed in the presence of a water-insoluble phosphate of a metal of group B and the ion of said metal of group A. Thus, for example, (i) the phosphate of the metal of group B may be formed in an aqueous solution in which the ions of the metals of group A and group B coexist, followed by formation of the group A metal hydroxide or (ii) the water-insoluble phosphate of the metal of group B may be formed in an aqueous solution free of the ion of the metal of group A, followed by addition of the ion of the metal of group A and formation of the hydroxide thereof.

When the composition is formed using an aqueous solution containing the ions of the metals of group A and group B, the aqueous solution (generally with a pH of about 0 to 6) containing a compound of the metal of group A and a compound of the metal of group B is adjusted to a pH of not more than 4 with stirring, if necessary by adding an acid, to avoid possible formation of an insoluble hydroxide salt of the metal of group A. Then, phosphoric acid or a phosphate salt is added to the aqueous solution to give a precipitate of a water-insoluble phosphate of the metal of group B alone.

An agent for such pH adjustment is an appropriate alkali or acid. Preferred examples of the alkali are inorganic alkalis such as alkali and alkaline earth metal hydroxides (e.g. sodium hydroxide, potassium hydroxide, calcium hydroxide) and ammonia, and organic amines such as triethanolamine. Preferred acids are hydrochloric acid, nitric acid, sulfuric acid, acetic acid, formic acid, oxalic acid and the like.

Preferred examples of the phosphoric acid compound to form the water-insoluble phosphate salt are phosphoric acid, mono-, di- and trisodium phosphate, mono-, di- and tripotassium phosphate, and mono-, di- and triammonium phosphate, among others.

The water-insoluble phosphate of the metal of group B is then aged for crystallization. Such aging is carried out by allowing the reaction mixture to stand at room temperature, or warming at a temperature not higher than 100° C. for a prolonged period of time, or heating under reflux.

After aging, the pH is adjusted to 4 to 12 by adding an alkali. In this pH range, the metal of group A forms a water-insolble precipitate of a hydrate oxide to give a mixed precipitate composed of said precipitate and the precipitate of water-insoluble phosphate of the group B metal. Such reaction is generally carried out in the temperature range of from ordinary temperature to about 100° C. When the rate of reaction is slow at ordinary temperature, warming or heating may be effected. The reaction may be conducted under pressure at a temperature exceeding 100° C., if necessary. Air may be used for agitation.

In an alternative process for producing the mixed precipitate, phosphoric acid or a phosphate salt is added to an aqueous solution containing the ion of a metal of group B and not containing group A metal ions to form the water-insoluble phosphate salt in the first place. After aging this phosphate and, if necessary, after adjustment of the pH to 4 or below, a metal salt containing the ion of a metal of group A or an aqueous solution containing said salt is added to the phosphate-containing mixture. Then, the mixture is stirred and the pH is adjusted to 4 or higher to give a mixed precipitate. In this process, the aging of the phosphate of the group B metal may be finished in a relatively short period. The obtained composition is usually in a form of a mixed gel.

The precipitate thus obtained is treated in a conventional manner, namely collected by filtration, washed thoroughly with deionized water for removing residual anion species, and then dried to give a desired product. The operation of the filtration procedure may comprise the use of a filter paper or filter cloth at ordinary temperature and ordinary pressure, centrifugation, pressure filtration or vacuum filtration, for instance. The washing procedure may be carried out in the manner of decantation. The drying step is conducted by air drying or at a temperature not higher than about 400° C., preferably not higher than 200° C. There are some cases where a metal hydroxide in the dried precipitates was partially converted into a metal oxide.

The dried product thus obtained may be used as such or ground or comminuted. Furthermore, the fine granules may be granulated and molded or shaped into spheres, pellets, coarse granules or the like, or molded or shaped into such forms as honeycombs, thin plates or films. The fine granules may further be, carried on an appropriate substrate, or incorporated into macromolecular films or into synthetic fibers to give composite fibers. The fine granules may be compounded into a powder type deodorant (powder-spray).

The present invention is illustrated by the following Examples, which do not, however, limit its scope.

EXAMPLE 1

Crystalline ferrous sulfate ($FeSO_4.7H_2O$; 27.8 g) was dissolved in 1 liter of distilled water. Then, 32.2 g of crystalline zirconium oxychloride ($ZrOCl_2, 8H_2O$) was added to and dissolved in the aqueous solution. The resultant aqueous solution contained 0.1 mole each of the Fe(II) ion and Zr(IV) ion and had a pH of about 0.5. To this aqueous solution was added dropwise about 140 g of a phosphoric acid solution (15% by weight) at room temperature with stirring, whereupon a white precipitate formed. The mixture was allowed to stand at room temperature for 24 hours. A sodium hydroxide solution (15% by weight) was then added dropwise into the mixture until the pH 11 with stirring to give a blue green precipitate. Subsequently air was bubbled through the reaction mixture warmed to 50° C. to 80° C., at a rate of 1 liter per minute, with contained stirring. A decrease in pH was observed. The pH was maintained at 10 by adding dropwise a sodium hydroxide solution (15% by weight). After blowing air into the mixture with stirring until no more decrease in pH was observed, a black precipitate containing Fe(II,III)-Zr(IV) was obtained. This precipitate was collected by suction filtration, washed with deionized water until neutral washings were obtained, and dried at a temperature of not higher than 50° C. The dried precipitate was ground in a mortar to a grain size of not more than 120 microns. A black powder containing Fe(II,III)-Zr(IV) was thus obtained.

The resultant powder was evaluated for the capacity of adsorb malodorous substances by the following method using hydrogen sulfide and ammonia. Thus, 40 mg of the dried powder was placed in a 2,000-ml glass desiccator (equipped with a stirrer) and the desiccator was fitted with a rubber stopper. One of the malodorous gases was injected into the desiccator to an initial concentration (Co) of 100 ppm using a syringe. Thirty minutes after gas injection, the air within the desiccator was sampled using a microsyringe, the sample was analyzed for the concentration (C) of the malodorous gas using a gas chromatograph (Shimadzu model GC-14A) and the percent elimination was calculated. The results thus obtained are shown later herein in Table 1.

EXAMPLE 2

Crystalline zinc chloride ($ZnCl_2$; 34.1 g) was dissolved in 1 liter of distilled water. Then, 80.5 g of crystalline zirconium oxychloride ($ZrOCl_2.8H_2O$) was added to and dissolved in the aqueous solution. The resultant aqueous solution contained 0.25 mole each of the Zn(II) ion and Zr(IV) ion and had a pH of about 1.5. To this aqueous solution was added dropwise about 330 g of a phosphoric acid solution (15% by weight) at room temperature with stirring, whereupon a white precipitate formed. The reaction mixture, as such, was allowed to standard overnight at room temperature for 24 hours. Then, a sodium hydroxide solution (15% by weight) was added dropwise to the white precipitate-containing mixture until the pH of the mixture reached 8.0, whereupon a further white precipitate formed. Stirring was continued at room temperature while the pH was maintained at 8. The pH was maintained by adding a sodium hydroxide solution (15% by weight) when a pH fall was observed. Stirring was contained until no more pH drop was observed, and then a white precipitate containing Zn(II)-Zr(IV) was obtained. This white precipitate was collected by suction filtration, washed with warm deionized water until no more chloride ions were detected, and then dried at 40° C. The dried precipitate was ground in a mortar to a grain size of not more than 120 microns to give a white powder containing Zn(II)-Zr(IV). This powder was evaluated for its capacity to adsorb malodorous gases in the same manner as described in Example 1. The results thus obtained are shown later herein in Table 1.

EXAMPLES 3 to 6

Several powders differing in Zn(II)/Zr(IV) mole ratio were produced in the same manner as in Example 2 except that the mole ratio between the Zn(II) ion and Zr(IV) ion was varied as specified in Table 1. The adsorption characteristics of these powders for malodorous gases are shown in Table. 1.

EXAMPLES 7 to 9

Three powders containing Co(II)-Zr(IV), Ni(II)-Zr(IV) and Cu(II)-Zr(IV), respectively, were produced by following the procedure of Example 2 but using the Co(II), Ni(II) and Cu(II) ions, respectively, in lieu of the Zn(II) ion (group A metal ion). The adsorption characteristics of these powders for malodorous gases are shown in Table 1. The metal salts used were as follows.

| Group A metal | Salt used |
| --- | --- |
| Co(II) ion | Cobalt(II) chloride ($CoCl_2.6H_2O$) |
| Ni(II) ion | Nickel(II) chloride ($NiCl_2.6H_2O$) |
| Cu(II) ion | Copper(II) chloride ($CuCl_2$) |
| Zr(IV) ion | Zirconium oxychloride ($ZrOC_{l2}.8H_2O$) |

EXAMPLES 10 AND 11

Powders were produced by following the procedure of Example 2 but using Zn(II)-Sn(IV) or Zn(II)-Ti(IV) as the group A metal ion-group B metal ion combination. The adsorption characteristics of these powders for malodorous gases are shown in Table 1. The metal salts used were as follows: Tin(IV) chloride ($SnCl_4$) as the Sn(IV) ion source; titanium(IV) chloride ($TiCl_4$) as the Ti(IV) ion source; and zinc(II) chloride ($ZnCl_2$) as the Zn(II) ion source.

EXAMPLE 12

Crystalline zirconium oxychloride ($ZrOCl_2.8H_2O$; 80.5 g) was dissolved in 1 liter of distilled water. The resultant aqueous solution contained 0.25 mole of the Zr(IV) ion. Then, 330 g of a phosphoric acid solution (15% by weight) was added dropwise to said aqueous solution with stirring at room temperature, whereupon a white precipitate formed. The precipitate-containing mixture was allowed to stand at room temperature for 24 hours. The pH was about 1.2.

Crystalline zinc chloride ($ZnCl_2$; 34.1 g) was dissolved in the above white precipitate-containing reaction mixture with stirring at room temperature. To this aqueous mixture was added dropwise a sodium hydroxide solution (15% by weight) until the pH of the mixture reached 8.0, whereupon a further white precipitate formed. Stirring was then continued at room temperature while the pH was maintained at 8 by adding a sodium hydroxide solution (15% by weight) on a fall of a pH. After stirring was continued until no more pH drop was observed, a white precipitate containing Zn(II)-Zr(IV) was obtained. The white precipitate was collected by suction filtration, washed with warm deonized water until no more chloride ions were detected, and then dried at 40° C. The dried powder thus obtained was ground in a mortar to a grain size of not more than 120 microns to give a white powder containing Zn(II)-Zr(IV). The adsorption characteristics of this powder for malodorous gases are shown in Table 1.

COMPARATIVE EXAMPLE 1

Crystalline zirconium oxychloride (80.5 g) was dissolved in 1 liter of water. This aqueous solution contained 0.25 mole of the Zr(IV) ion. Then, 330 g of a phosphoric acid solution (15% by weight) was added dropwise to the aqueous solution with stirring at room temperature, whereupon a white precipitate formed. The mixture was allowed to stand at room temperature for 24 hours.

A sodium hydroxide solution (15% by weight) was then added dropwise to the white precipitate-containing aqueous mixture with stirring at room temperature until the pH reached 8.0. Stirring was then continued at room temperature while the pH was maintained at 8 by adding a sodium hydroxide solution (15% by weight). Stirring was continued until no more pH drop was observed.

The resultant white precipitate was collected by suction filtration, washed with warm deionized water until no more chloride ions were detected, and then dried at 40° C. The dried product was ground in a mortar to a grain size of not more than 120 microns. A Zr(IV)-containing white powder was obtained. The adsorption characteristics of this powder for malodorous gases are shown in Table 1.

COMPARATIVE EXAMPLE 2

Crystalline zinc chloride ($ZnCl_2$; 34.1 g) was dissolved in 1 liter of water. This aqueous solution contained 0.25 mole of the Zn(II) ion. To this aqueous solution was added 330 g of 15% (by weight) phosphoric acid with stirring at room temperature. The resultant mixture was allowed to stand at room temperature for 24 hours.

To this reaction mixture was added dropwise 15% (by weight) sodium hydroxide with stirring at room temperature until the pH reached 8.0, whereupon a white precipitate formed. Stirring was then continued at room temperature while the pH was maintained at 8 by adding 15% (by weight) sodium hydroxide. Stirring was thus continued until no more pH drop was observed. A white precipitate containing Zn(II) formed.

The precipitate was treated in the same manner as in Comparative Example 1 to give a white powder. The adsorption characteristics of this powder for malodorous gases are shown in Table 1.

COMPARATIVE EXAMPLE 3

A composition was prepared by mixing portions of the powders obtained in Comparative Examples 1 and 2 with each other in a mole ratio (Zn(II):Zr(IV)) of 1:1 and a 40-mg portion thereof was evaluated for its capacity to absorb malodorous gases by the method described in Example 1. The measurement results are shown in Table 1.

COMPARATIVE EXAMPLES 4 AND 5

A commercial grade of activated carbon and a commercially available zeolite-based deodorizer were purchased and 40 mg of each was evaluated for adsorption characteristics for malodorous gases by the method described in Example 1. The measurement results are shown in Table 1.

TABLE 1

| | | Adsorption characteristics | | | |
|---|---|---|---|---|---|
| | | $H_2S$ | | $NH_3$ | |
| | Composition of sample | Co/C (ppm) | % Elimination | Co/C (ppm) | % Elimination |
| Example 1 | Fe(II,III)—Zr(IV) precipitate; Fe:Zr mole ratio = 1:1 | 100/5 | 95 | 100/25 | 75 |
| Example 2 | Zn—Zr precipitate; Zn:Zr mole ratio = 1:1 | 100/0 | 100 | 100/8 | 92 |
| Example 3 | Zn—Zr precipitate; Zn:Zr mole ratio = 4:1 | 100/0 | 100 | 100/20 | 80 |
| Example 4 | Zn—Zr precipitate; Zn:Zr mole ratio = 3:2 | 100/0 | 100 | 100/7 | 93 |
| Example 5 | Zn—Zr precipitate; Zn:Zr mole ratio = 2:3 | 100/0 | 100 | 100/7 | 93 |
| Example 6 | Zn—Zr precipitate; Zn:Zr mole ratio = 1:4 | 100/20 | 80 | 100/6 | 94 |
| Example 7 | Co—Zr precipitate; Co:Zr mole ratio = 1:1 | 100/22 | 78 | 100/11 | 89 |
| Example 8 | Ni—Zr precipitate; Ni:Zr mole ratio = 1:1 | 100/40 | 60 | 100/10 | 90 |
| Example 9 | Cu—Zr precipitate; Cu:Zr mole ratio = 1:1 | 100/1 | 99 | 100/10 | 90 |
| Example 10 | Zn—Sn precipitate; Zn:Sn mole ratio = 1:1 | 100/0 | 100 | 100/15 | 85 |
| Example 11 | Zn—Ti precipitate; Zn:Ti mole ratio = 1:1 | 100/0 | 100 | 100/6 | 94 |
| Example 12 | Zn—Zr precipitate; Zn:Zr mole ratio = 1:1 | 100/0 | 100 | 100/7 | 93 |
| Comparative Example 1 | Zr precipitate | 100/90 | 10 | 100/7 | 93 |
| Comparative Example 2 | Zn precipitate | 100/0 | 100 | 100/100 | 0 |
| Comparative Example 3 | Zn precipitate + Zr precipitate; Zn:Zr mole ratio = 1:1 | 100/1 | 99 | 100/25 | 75 |
| Comparative Example 4 | Commercial grade activated carbon (coconut shell-derived; product of Takeda Chemical Industries) | 100/79 | 21 | 100/91 | 9 |
| Comparative | Zeolite-based adsorbent (Abscents; product | 100/98 | 2 | 100/59 | 41 |

TABLE 1-continued

| | Adsorption characteristics | | | |
|---|---|---|---|---|
| | $H_2S$ | | $NH_3$ | |
| Composition of sample | Co/C (ppm) | % Elimination | Co/C (ppm) | % Elimination |
| Example 5 of Union Carbide) | | | | |

Co = Initial concentration (ppm); C = concentration after 30 minutes (ppm).

EXAMPLE 13

A solution (30%) 28.0 g of titanium sulfate (Ti(SO$_4$)$_2$) and crystalline copper(II) chloride (CuCl$_2$; anhydride) 4.7 g were added to and dissolved in 80 ml of distilled water. The resultant aqueous solution contained 0.035 mole each of the Cu(II) ion and Ti(IV) ion (i.e. mole ratio (Cu/Ti)=5/5) and had a pH of about 1.0. To this aqueous solution was added dropwise about 46 g of a phosphoric acid solution (15% by weight) at room temperature with stirring, whereupon a white precipitate formed. The solution had a pH range of 0.5 to 1.5. The reaction mixture was allowed to stand at room temperature with stirring for 24 hours. Then, a sodium hydroxide solution (15% by weight) was added dropwise with stirring to the white precipitate-containing mixture until the pH of the mixture reached 8.0, whereupon a pale precipitate formed. Stirring was contained at room temperature while the pH was maintained at 8. The pH was maintained by adding a sodium hydroxide solution (15% by weight) when a pH fall was observed. Stirring was continued until no more pH drop was observed, and then a pale precipitate containing Cu(II)-Ti(IV) was obtained. This pale precipitate was collected by suction filtration, washed with warm deionized water until no more chloride ions were detected, and then dried at 40° C. The dried precipitate was ground in a mortar to a grain size of not more than 120 microns to give a pale powder containing Cu(II)-Ti(IV).

the resultant powder was evaluated for the capacity to adsorb malodorous substances by the following method using hydrogen sulfide and methyl mercaptan. Thus, the dried powder (10 mg) was charged in a one-liter glass bottle equipped with a cap. Hydrogen sulfide was injected into the glass bottle to an initial concentration of 100 ppm. The air within the glass bottle was analyzed using a gas chromatograph. When the concentration of the hydrogen sulfide became about 0 ppm, an additional gas was injected into the glass bottle to a concentration of 100 ppm. The procedure was repeated until the powder could not absorb an additional gas, and the capacity of the power to adsorb hydrogen sulfide was calculated. The capacity to adsorb methyl mercaptan was evaluated in the same manner as described above. The results are shown in Table 2.

EXAMPLES 14 and 15

Two pale powders differing in Cu(II)/Ti(IV) mole ratio was produced in the same manner as described in Example 13 except that the mole ratio between the Cu(II) ion and Ti(IV) ion was varied as specified in Table 2. The adsorption characteristics of these powders for malodorous gases were evaluated in the same manner as described in Example 13. The results are shown in Table 2.

EXAMPLES 16 to 18

A molding auxiliary (Biopoly; Trade name, product of Takeda Chemical Industries, 25 g) and a proper quantity of water were added to each powder (500 g) containing Cu(II)-Ti(IV) which was obtained in examples 13, 14 and 15. The mixture was mixed in a kneader in one hour to give a mixed composition for extrusion. Then, the mixed composition wash charged in Flow-tester (Trade name, produced by Shimadzu Corporation, Model CFT-500) equipped with a die for a round molded rod (2 mm$\phi$) and formed into a molding in a form of a rod (2 mm$\phi$). The molding was dried at a temperature of 40° C. in 24 hours, thereafter was ground precisely to a grain size of 16 to 22 mesh/inch (JIS) to give a granule containing Cu(II)-Ti(IV) precipitate.

Then, the granule (1.5 ml) was charged in a glass column (8 mm$\phi$). An air containing 10 ppm each of hydrogen sulfide, methyl mercaptan and ammonia was passed through the column at a flow rate of 1 l/min in 200 hours.

The amounts of adsorbed gases were evaluated in the same manner as described above. The results are shown in Table 3.

EXAMPLE 19

The powder (1000 g) in Example 14 (Cu(II)/Ti(IV)=3/7) was treated in the same manner as described in Example 17 to give a mixed composition for extrusion. Then, the mixed composition was formed into a honeycomb molding (8 mm$\phi$, 300 cell/inch$^2$) by an extruder (produced by Honda Tekkoh, Model DE-35). The molding was dried at a temperature of 40° C. in 24 hours. The amount of adsorbed gas was evaluated in the same manner as described in Example 17. The result is shown in Table 3.

TABLE 2

| Example | Composition of sample | Cu/Ti mole ratio | Capacity of adsorption(mg/g) | |
|---|---|---|---|---|
| | | | $H_2S$ | $CH_3SH$ |
| Example 13 | Cu(II)/Ti(IV) | 5/5 | 2640 | 3080 |
| Example 14 | Cu(II)/Ti(IV) | 3/7 | 2900 | 3520 |
| Example 15 | Cu(II)/Ti(IV) | 1/9 | 2210 | 2400 |

TABLE 3

| Example | Composition of sample | Cu/Ti mole ratio | Form | Amount of adsorbed gas(mg/g)* | | |
|---|---|---|---|---|---|---|
| | | | | $H_2S$ | $CH_3SH$ | $NH_3$ |
| Example 16 | Cu(II)/Ti(IV) | 5/5 | granule | 322 | 452 | 97 |
| Example 17 | Cu(II)/Ti(IV) | 3/7 | granule | 330 | 460 | 110 |
| Example 18 | Cu(II)/Ti(IV) | 1/9 | granule | 304 | 366 | 109 |

TABLE 3-continued

| Example | Composition of sample | Cu/Ti mole ratio | Form | Amount of adsorbed gas(mg/g)* | | |
|---|---|---|---|---|---|---|
| | | | | $H_2S$ | $CH_3SH$ | $NH_3$ |
| Example 19 | Cu(II)/Ti(IV) | 3/7 | honeycomb | 314 | 414 | 94 |

* flow rate: 1 l/min × 200 hours

EFFECTS OF THE INVENTION

The precipitate composition or adsorbent composition according to the invention shows high adsorption capacity for acidic malodorous gases, such as hydrogen sulfide, as well as alkaline malodorous gases, such as ammonia. The composition according to the invention shows higher adsorption capacity as compared, on the same chemical composition and same weight basis, with a simple mixture of a compound containing the corresponding metal in ionic form selected from the group A and a compound containing the corresponding metal in ionic form selected from the group B. Furthermore, the composition according to the invention shows a high rate of adsorption, hence can rapidly produce a deodorizing effect, and said effect can last for a prolonged period of time.

Therefore said composition can be used widely in eliminating malodors or toxic gases offering problems in daily living environments as well as malodors emanating from various disposal facilities or plants, industrial facilities or plants and so forth.

What is claimed is:

1. A dried mixed-gel composition for the removal of malodorous substances or components comprising:
   at least one water-insoluble metal phosphate in which the metal is selected from the group B below; and
   at least one metal hydroxide in which the metal is selected from the group A below:

Group A: Fe, Co, Ni, Zn and Cu;

Group B: Ti, Zr and Sn;

wherein the mole ratio between the ion of the metal of the wherein the mole ratio between the ion of the metal of the group A and the ion of the metal of the group B "(A)/(B)" is in the range of 0.01/1 to 100/1, said composition being produced by
   adding phosphoric acid, a phosphate or a mixture thereof to an aqueous solution containing at least one metal ion in which the metal is selected from the group A; and at least one metal ion in which the metal is selected from the group B; and having a pH of not more than 4 to form a water-insoluble phosphate of the metal of group B, and then
   adjusting the resultant mixture to a pH of more than 4 to form a hydroxide of the metal of group A.

2. A dried mixed-gel composition for the removal of malodorous substances or components comprising at least one water-insoluble metal phosphate in which the metal is selected from the group B below; and at least one metal hydroxide in which the metal is selected from the group A below:

Group A: Fe, Co, Ni, Zn and Cu;

Group B: Ti, Zr and Sn wherein the mole ratio between the ion of the metal of the group A and the ion of the metal of the group B "(A)/(B)" is in the range of 0.01/1 to 100/1, said composition being produced by
   adding phosphoric acid, a phosphate or a mixture of these to an aqueous solution containing at least one metal ion in which the metal is selected from the group B to form a water-insoluble metal phosphate, and then
   adding a compound containing at least one metal ion in which the metal is selected from the group A to form a hydroxide of the metal of group A at a pH of more than 4 in the presence of said phosphate and the ion of the metal of Group A.

3. A composition as claimed in claim 1 or 2, wherein the metal hydroxide is copper hydroxide.

4. A composition as claimed in claim 1 or 2, wherein the metal phosphate is titanium phosphate.

5. A composition as claimed in claim 1 or 2, wherein the metal hydroxide is copper hydroxide and the metal phosphate is titanium phosphate.

6. A composition as claimed in claim 1 or 2, wherein the metal hydroxide is zinc hydroxide and the metal phosphate is zirconium phosphate.

7. A composition as claimed in claim 1 or 2, wherein the metal hydroxide is copper hydroxide and the metal phosphate is zirconium phosphate.

8. A composition as claimed in claim 1 or 2, wherein the metal hydroxide is zinc hydroxide and the metal phosphate is tin phosphate.

9. A composition as claimed in claim 1 or 2, wherein the metal hydroxide is zinc hydroxide and the metal phosphate is titanium phosphate.

10. A composition as claimed in claim 1 or 2, wherein the metal hydroxide is cobalt hydroxide and the metal phosphate is titanium phosphate.

11. A composition as claimed in claim 1 or 2, wherein the mole ratio between the ion of the metal of group A and the ion of the metal of group B [(A)/(B)] is in the range of 0.1/1 to 10/1.

12. A composition as claimed in claim 1 or 2, wherein the mole ratio between the ion of the metal of group A and the ion of the metal of group B [(A)/(B)] is in the range of 0.2/1 to 5/1.

13. A composition as claimed in claim 1 or 2, which is in the form of a granule.

14. A composition as claimed in claim 1 or 2, which is in the form of a honeycomb.

15. A composition as claimed in claim 1 or 2, which is in the form of a powder.

16. A method of producing a dried mixed-gel composition for the removal of malodorous substance or components which comprises:
   adjusting the pH of an aqueous solution containing at least one water-insoluble metal phosphate in which the metal is selected from the group B below and at least one metal ion in which the metal is selected from the group A below to give a mixture of a hydroxide of the metal of group A and the water-insoluble phosphate of the metal of group B;

Group A: Fe, Co, Ni, Zn and Cu;

Group B: Ti, Zr and Sn;

wherein the mole ratio between the ion of the metal of the group A and the ion of the metal of the group B "(A)/(B)" is in the range of 0.01/1 to 100./1.

* * * * *

UNITED STATES PATENT AND TRADEMARK OFFICE
CERTIFICATE OF CORRECTION

PATENT NO. : 5,234,884
DATED : August 10, 1993
INVENTOR(S) : MOTOYA MOURI and TATSURO TAKEUCHI It is certified that error appears in the above-identified patent and that said Letters Patent is hereby corrected as shown below:

On the cover page of the patent, the left hand column, under section "[22] PCT Filed:", change "Nov. 30, 1989" to read —[22] PCT Filed: Nov. 28, 1990—.

Signed and Sealed this

Fifth Day of April, 1994

Attest:

BRUCE LEHMAN

Attesting Officer      Commissioner of Patents and Trademarks